US012706077B2

(12) United States Patent
Ku et al.

(10) Patent No.: US 12,706,077 B2
(45) Date of Patent: Aug. 11, 2026

(54) AUDIO LIMITER

(71) Applicant: Bose Corporation, Framingham, MA (US)

(72) Inventors: Emery Ku, Sudbury, MA (US); Benjamin Isaac Raubvogel, Thornhill (CA); Michael S. D'Agostino, Billerica, MA (US)

(73) Assignee: Bose Corporation, Framingham, MA (US)

( * ) Notice: Subject to any disclaimer, the term of this patent is extended or adjusted under 35 U.S.C. 154(b) by 77 days.

(21) Appl. No.: 18/143,748

(22) Filed: May 5, 2023

(65) Prior Publication Data

US 2024/0371353 A1 Nov. 7, 2024

(51) Int. Cl.
*H04R 1/10* (2006.01)
*G10K 11/178* (2006.01)

(52) U.S. Cl.
CPC .. *G10K 11/17825* (2018.01); *G10K 11/17881* (2018.01); *H04R 1/1083* (2013.01); *G10K 11/17823* (2018.01); *G10K 2210/1081* (2013.01); *G10K 2210/3012* (2013.01); *G10K 2210/3026* (2013.01); *G10K 2210/3027* (2013.01); *G10K 2210/3028* (2013.01); *G10K 2210/3055* (2013.01); *G10K 2210/3056* (2013.01); *H04R 2460/01* (2013.01)

(58) Field of Classification Search
CPC .............. H04R 1/1083; H04R 2460/01; G10K 2210/1081; G10K 2210/3056
See application file for complete search history.

(56) References Cited

U.S. PATENT DOCUMENTS

2014/0086425 A1* 3/2014 Jensen ............. G10K 11/17825 381/71.11
2018/0124532 A1 5/2018 Shetye et al.
2019/0043467 A1 2/2019 Zhou et al.
2019/0130928 A1* 5/2019 Rule ........................ G10L 25/84
2020/0374617 A1 11/2020 Liu et al.
2021/0337299 A1 10/2021 Dickins et al.
2022/0223133 A1 7/2022 Mccutcheon et al.
2023/0060353 A1 3/2023 Gandhi et al.
2023/0080298 A1 3/2023 Yu et al.
2024/0276135 A1* 8/2024 Davis ................... H04R 1/1083

FOREIGN PATENT DOCUMENTS

GB 2500251 9/2013

OTHER PUBLICATIONS

International Search Report and Written Opinion for International Application No. PCT/US2024/027691, dated Dec. 4, 2024, 15 pages.

* cited by examiner

*Primary Examiner* — Ping Lee

(57) ABSTRACT

A method is performed by active noise reduction (ANR) headphones. The method includes comparing a feedback microphone signal to a predicted feedback microphone signal representing what the feedback microphone signal would be expected to look like if there were no leak between the headphones and a user wearing the headphones. An audio limiter is adaptively adjusted based, at least in part, on the comparison.

11 Claims, 8 Drawing Sheets

AUDIO LIMITER

BACKGROUND

Aspects of the disclosure generally relate to adaptively adjusting an audio limiter in active noise reduction (ANR) headphones based, at least in part, on a determined state of the headphones relative to the user's head or ears.

Banded ANR headsets have a known issue in which, under specific conditions, there is an interaction between the ANR system and the audio playback that will cause them to distort. Those specific conditions being high volume, high bass, and a bad fit—i.e., where there are leaks between earcups and head.

This problem is not new, nor is the use of an audio limiter to deal with it. However, prior solutions to address this issue have been relatively unsophisticated. That is, they limit the audio regardless of the current fit or the state of the system. Current limiter-based solutions just look at the audio (music) coming in through the playback path and if it is loud and has a lot of bass, then they conservatively reduce the output because there is the potential for it to distort.

SUMMARY

An improvement proposed by the present disclosure is an ability to detect a state of a system (e.g., an ANR headphones) and only limit audio when, and to the extent, it needs to be to inhibit or prevent distortion due to clipping. If there is a good seal or only a small leak, the proposed solution will provide enhanced performance (more bass out of the headphones) because it has better knowledge of what is going on, whereas the current system turns it down just in case. So, the improved system makes smarter decisions and is more dynamic to provide better performance depending on the state of the system.

All examples and features mentioned below can be combined in any technically possible way.

One aspect features a method that is performed by active noise reduction (ANR) headphones. The method includes comparing a feedback microphone signal to a predicted feedback microphone signal representing what the feedback microphone signal would be expected to look like if there were no leak between the headphones and a user wearing the headphones—this assumes that there is some driver excitation (either hear-through/transparency or audio content) that dominates what is received at the feedback microphone. An audio limiter is adaptively adjusted based, at least in part, on the comparison.

Implementations may include one of the following features, or any combination thereof.

In some implementations, comparing the feedback microphone signal to the predicted feedback microphone signal includes providing the feedback microphone signal and the predicted feedback microphone signal as inputs to a leak detector.

In certain implementations, the leak detector includes a high-pass filter and comparing the feedback microphone signal to the predicted feedback microphone signal includes filtering the predicted feedback microphone signal with the high-pass filter to provide a high-pass filtered signal.

In some cases, comparing the feedback microphone signal to the predicted feedback microphone signal includes determining an error signal corresponding to a difference between the feedback microphone signal and the high-pass filtered signal. The method may also include providing the error signal to an adaptive algorithm and using output of the adaptive algorithm to update a transfer function of the high-pass filter.

In certain cases, the audio limiter is adjusted based on a center frequency value of the high-pass filter.

In another aspect, an active noise reduction (ANR) audio output device includes a memory that includes computer-executable instructions, and a processor that is configured to execute the executable instructions and cause the audio output device to compare a feedback microphone signal to a predicted feedback microphone signal representing what the feedback microphone signal would be expected to look like if there were no leak between the headphones and a user wearing the headphones and adaptively adjust an audio limiter based, at least in part, on the comparison.

Implementations may include one of the above and/or below features, or any combination thereof.

In some examples, the computer-executable instructions for comparing the feedback microphone signal to the predicted feedback microphone signal include instructions for providing the feedback microphone signal and the predicted feedback microphone signal as inputs to a leak detector.

In certain examples, the leak detector includes a high-pass filter and comparing the feedback microphone signal to the predicted feedback microphone signal includes filtering the predicted feedback microphone signal with the high-pass filter to provide a high-pass filtered signal.

In some implementations, the computer-executable instructions for comparing the feedback microphone signal to the predicted feedback microphone signal include instructions for: determining an error signal corresponding to a difference between the feedback microphone signal and the high-pass filtered signal and providing the error signal to an adaptive algorithm and using output of the adaptive algorithm to update a transfer function of the high-pass filter.

In certain implementations, the computer-executable instructions for adaptively adjusting the audio limiter include instructions for adjusting the audio limiter based on a center frequency value of the high-pass filter.

Another aspect provides a method that is performed by active noise reduction (ANR) headphones. The method includes adaptively adjusting a gain applied to an audio signal to provide a gain adjusted audio signal. The audio signal and the gain adjusted audio signal are provided to an audio limiter; and the audio signal is limited based on the gain adjusted audio signal to provide an adjusted audio signal.

Implementations may include one of the above and/or below features, or any combination thereof.

In some cases, adaptively adjusting the gain applied to the audio signal includes adjusting the gain based on an output received from a leak detector.

In certain cases, the leak detector includes a high-pass filter and an adaptive algorithm that is configured to update a transfer function of the high-pass filter. The output of the leak detector corresponds to a center frequency value of the high-pass filter.

In some examples, the method includes translating the center frequency value to a gain value.

In certain examples, the center frequency value is translated to a gain value via a lookup table.

In some implementations, the method includes receiving a feedback microphone signal from a feedback microphone and filtering a driver signal with an estimate of a transfer function representing an acoustic path between an acoustic driver and the feedback microphone with a good fit to provide a predicted feedback microphone signal, representing what the feedback microphone signal would be expected to look like if there were no leak between the headphones and a user wearing the headphones. The predicted feedback microphone signal is then filtered with the high-pass filter to provide a high-pass filtered signal. An error signal, representing a difference between the feedback microphone signal and the high-pass filtered signal, is provided to the adaptive algorithm, and an output of the adaptive algorithm is used to update a transfer function of the high-pass filter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various aspects.

DETAILED DESCRIPTION

ANR headsets with leaky fits can lead to audible distortion and DAC clipping in very loud infrasonic noise environments or when very loud bass-heavy audio content is played. Traditionally, this has been mitigated by reducing bass output at higher volume levels or with the application of reactive dynamic limiters in the audio path. If the leak state is known, it can be used to proactively inform the upstream paths that could result in clipping.

Aspects of the present disclosure provide techniques, including headphones and ANR systems implementing the techniques, to dynamically adjust an audio limiter in an ANR audio output device (ANR headphones). The audio limiter adaptively adjusts both how much and when to limit incoming audio based on a determined state of the device relative to a user wearing the device. As described herein, in aspects, the audio limiter adaptively adjusts at least a lower frequency portion (e.g., low and/or mid-frequency portions) of an incoming audio signal based on the determined state of the headphones. The lower frequency portions are dynamically limited based on the state of the headphones because it is the portion of the incoming audio that are likely to cause the most distortion.

The state of the device is determined based on the quality of the seal or fit between the earcup of the headphones and the user's ear or head. The state varies from a good fit to a poor or leaky fit. Based on the extent to which the fit is good or leaky, the audio limiter adaptively limits the lower frequency portions of the incoming audio signal. When the fit is poor or leaky, the audio limiter limits the lower frequency portion(s) of the audio signal in an effort to mitigate distortion which would not be present when the fit is good. Advantageously, the audio limiter does not limit or reduce the amount of limiting of the lower frequency portion(s) of the audio signal when the fit is good or is becoming better.

Figure 1:
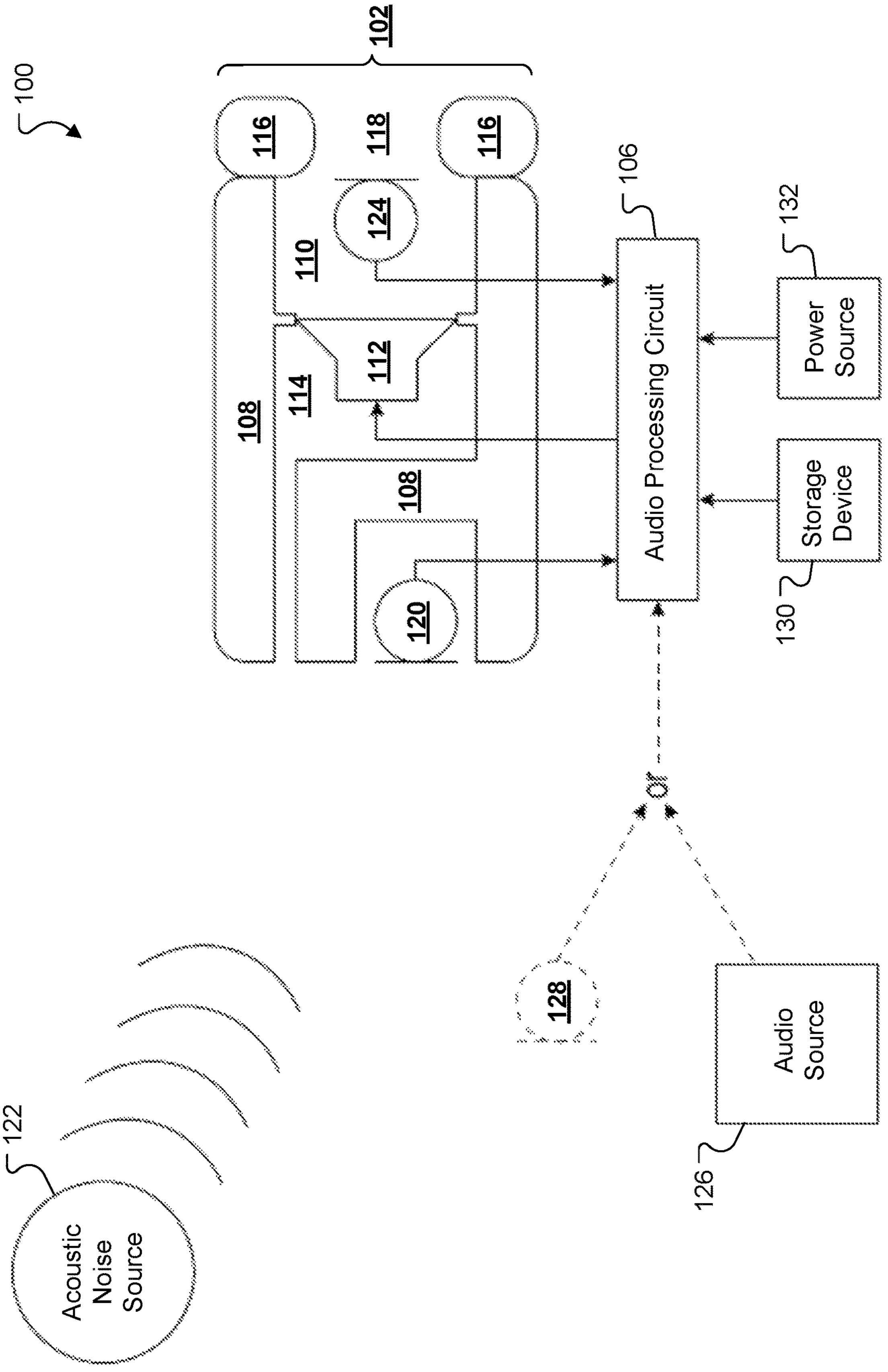
FIG. 1 is a block diagram of portions of an implementation of a personal ANR device.

FIG. 1 provides a block diagram of a personal active noise reduction (ANR) device (audio output device, headphones) 100 in accordance with aspects of the present disclosure. The device 100 may include a pair of earpieces 102 (also designated as left and right earpieces 102*a*, 102*b*, respectively, e.g., in FIG. 2) connected by a band, such as an over-the-head band (104 in FIG. 2), to provide ANR to both of the user's ears. For sake of simplicity of discussion, only a single earpiece 102 is depicted and described in relation to FIG. 1. As will also be explained in greater detail, the personal ANR device 100 incorporates at least one audio processing circuit 106 that may provide either or both of feedback-based ANR and feedforward-based ANR, in addition to possibly further providing pass-through audio.

Figure 4:
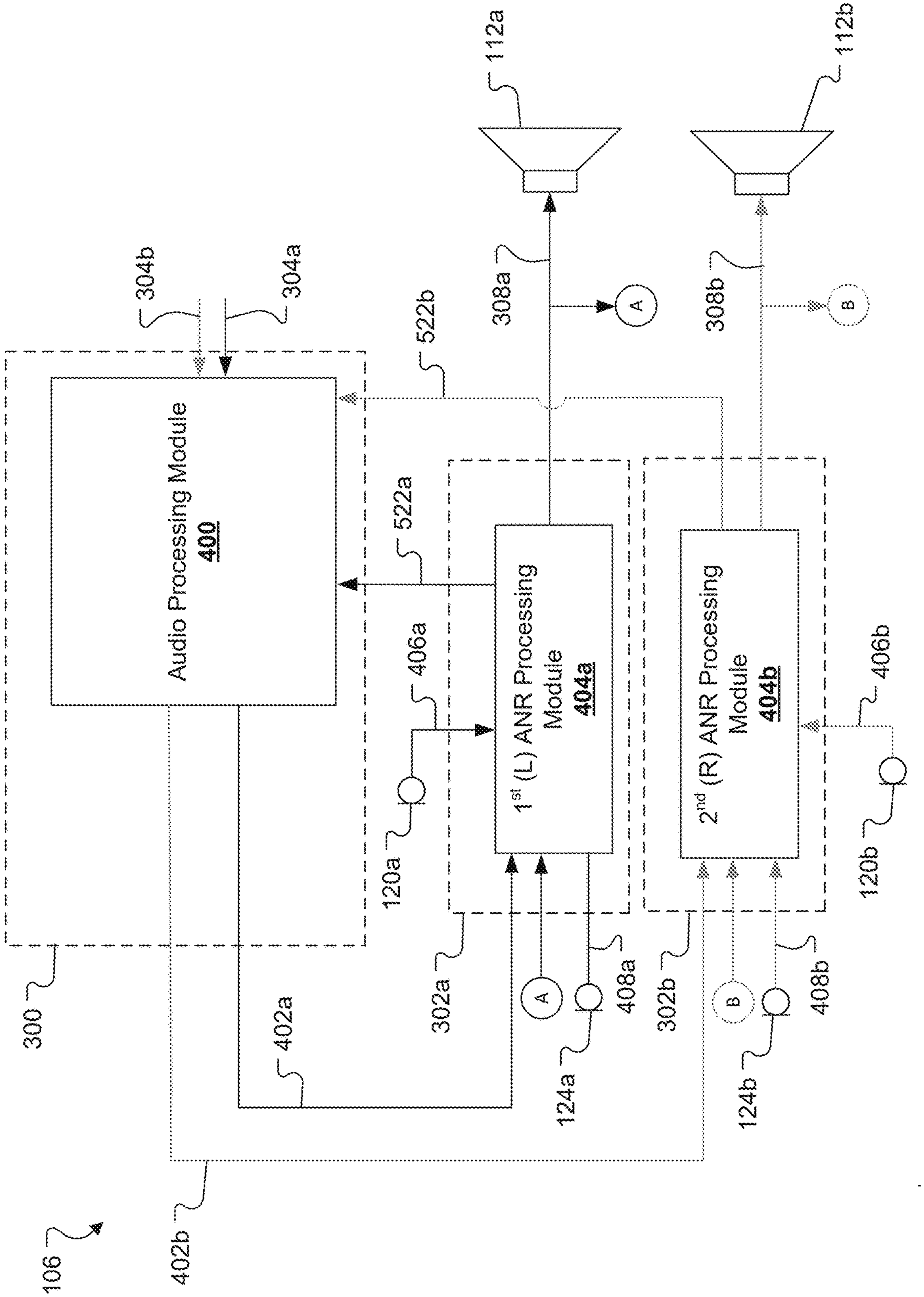

Each earpiece 102 incorporates a casing 108 having a cavity 110 at least partly defined by the casing 108 and by at least a portion of an acoustic driver 112 (also designated as left and right acoustic drivers 112*a*, 112*b*, respectively, e.g., in FIG. 4) disposed within the casing to acoustically output sounds to a user's ear. This manner of positioning the acoustic driver 112 also partly defines another cavity 114 within the casing 108 that is separated from the cavity 110 by the acoustic driver 112. The casing 108 carries an ear coupling 116 (also designated as left and right ear couplings 116*a*, 116*b*, respectively, e.g., in FIG. 2) surrounding an opening to the cavity 110 and having a passage 118 (also designated as left and right ear couplings 118*a*, 118*b*, respectively, e.g., in FIG. 2) that is formed through the ear coupling 116 and that communicates with the opening to the cavity 110. In some implementations, an acoustically transparent screen, grill or other form of perforated panel (not shown) may be positioned in or near the passage 118 in a manner that obscures the cavity and/or the passage 118 from view for aesthetic reasons and/or to protect components within the casing 108 from damage. The passage 118 acoustically couples the cavity 110 to the ear canal of the user's ear, while the ear coupling 116 engages portions of the ear to form at least some degree of acoustic seal therebetween. This acoustic seal enables the casing 108, the ear coupling 116 and portions of the user's head surrounding the ear canal (including portions of the ear) to cooperate to acoustically isolate the cavity 110, the passage 118 and the ear canal from the environment external to the casing 108 and the user's head to at least some degree, thereby providing some degree of passive noise reduction.

In aspects, a feedforward microphone 120 (also designated as left and right feedforward microphones 120*a*, 120*b*, respectively, e.g., in FIG. 4) is disposed on the exterior of the casing 108 or in any manner that is acoustically accessible to the environment external to the casing 108. This external positioning of the feedforward microphone 120 enables the feedforward microphone 120 to detect environmental noise sounds, such as those emitted by an acoustic noise source 122, in the environment external to the casing 108 without the effects of any form of passive noise reduction or ANR provided by the personal ANR device 100. As those familiar with feedforward-based ANR will readily recognize, these sounds detected by the feedforward microphone 120 are used as a reference from which feedforward anti-noise sounds are derived and then acoustically output into the cavity 110 by the acoustic driver 112. The derivation of the feedforward anti-noise sounds takes into account the characteristics of the passive noise reduction provided by the personal ANR device 100, characteristics and position of the acoustic driver 112 relative to the feedforward microphone 120, and/or acoustic characteristics of the cavity 110 and/or the passage 118. The feedforward anti-noise sounds are acoustically output by the acoustic driver 112 with amplitudes and time shifts calculated to acoustically interact with the noise sounds of the acoustic noise source 122 that are able to enter into the cavity 110, the passage 118 and/or an ear canal in a subtractive manner that at least attenuates them.

In aspects, a feedback microphone 124 (also designated as left and right feedback microphones 124*a*, 124*b*, respectively, e.g., in FIG. 4) is disposed within the cavity 110. The feedback microphone 124 is positioned in close proximity to the opening of the cavity 110 and/or the passage 118 so as to be positioned close to the entrance of an ear canal when the earpiece 102 is worn by a user. The sounds detected by the feedback microphone 124 are used as a reference from which feedback anti-noise sounds are derived and then acoustically output into the cavity 110 by the acoustic driver 112. The derivation of the feedback anti-noise sounds takes into account the characteristics and position of the acoustic driver 112 relative to the feedback microphone 124, and/or the acoustic characteristics of the cavity 110 and/or the passage 118, as well as considerations that enhance stability in the provision of feedback-based ANR. The feedback anti-noise sounds are acoustically output by the acoustic driver 112 with amplitudes and time shifts calculated to acoustically interact with noise sounds of the acoustic noise source 122 that are able to enter into the cavity 110, the passage 118 and/or the ear canal (and that have not been attenuated by whatever passive noise reduction) in a destructively additive manner that at least attenuates them.

Figure 6:
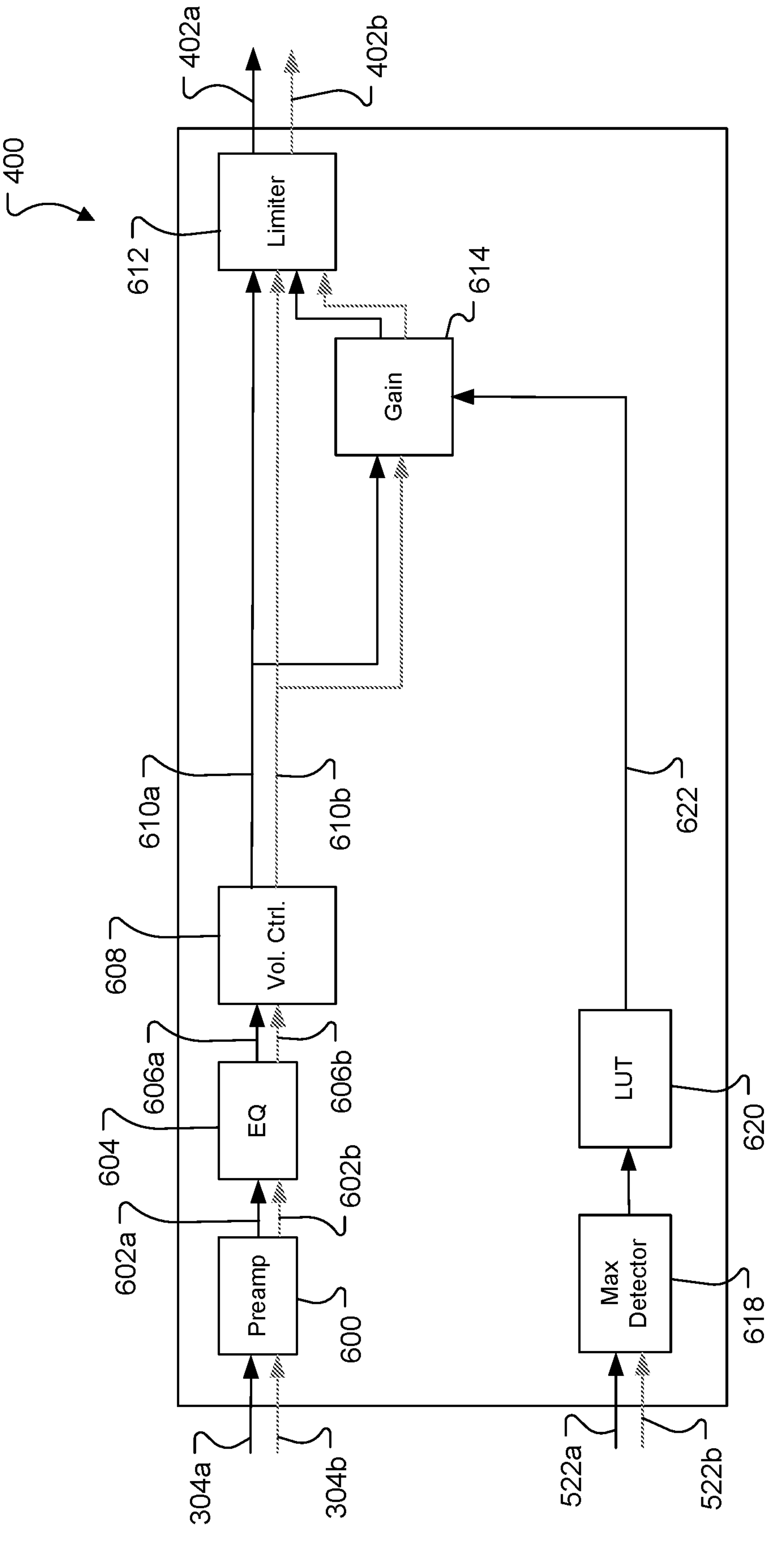
FIG. 6 is a block diagram of an audio processing module in accordance with aspects of the present disclosure.

The personal ANR device 100 further incorporates the audio processing circuit 106, portions which are associated with each earpiece 102 of the personal ANR device 100. The audio processing circuit 106 may include one or more processors configured to execute instructions to control the functionality of the device 100 including the dynamic, real-time adjustment of the audio limiter 612 (FIG. 6).

Either a portion of or substantially all of the audio processing circuit 106 may be disposed within the casing 108 of one of the earpieces 102. Alternatively and/or additionally, a portion of or substantially all the audio processing circuit 106 may be disposed within another portion of the personal ANR device 100. Depending on whether one or both of feedback-based ANR and feedforward-based ANR are provided in an earpiece 102 associated with the audio processing circuit 106, the audio processing circuit 106 is coupled to one or both of the feedback microphone 124 and the feedforward microphone 120. The audio processing circuit 106 is further coupled to the acoustic driver 112 to cause the acoustic output of anti-noise sounds.

In aspects providing pass-through audio, the audio processing circuit 106 is also coupled to an audio source 126 to receive incoming audio signals from the audio source 126 to be acoustically output by the acoustic driver 112. The incoming audio signals from the audio source, unlike the noise sounds emitted by the acoustic noise source 122, is audio that a user of the personal ANR device 100 desires to hear. In aspects, the incoming audio signals may be a playback of recorded audio, transmitted audio, or any of a variety of other forms of audio that the user desires to hear. In aspects, pass-through audio is received from a communications microphone 128 integrated into variants of the personal ANR device 100 employed in two-way communications in which the communications microphone 128 is positioned to detect speech sounds produced by the user of the personal ANR device 100.

In support of the operation of the audio processing circuit 106, the personal ANR device 100 may further incorporate one or both of a memory or storage device 130, a power source 132.

Figure 2:
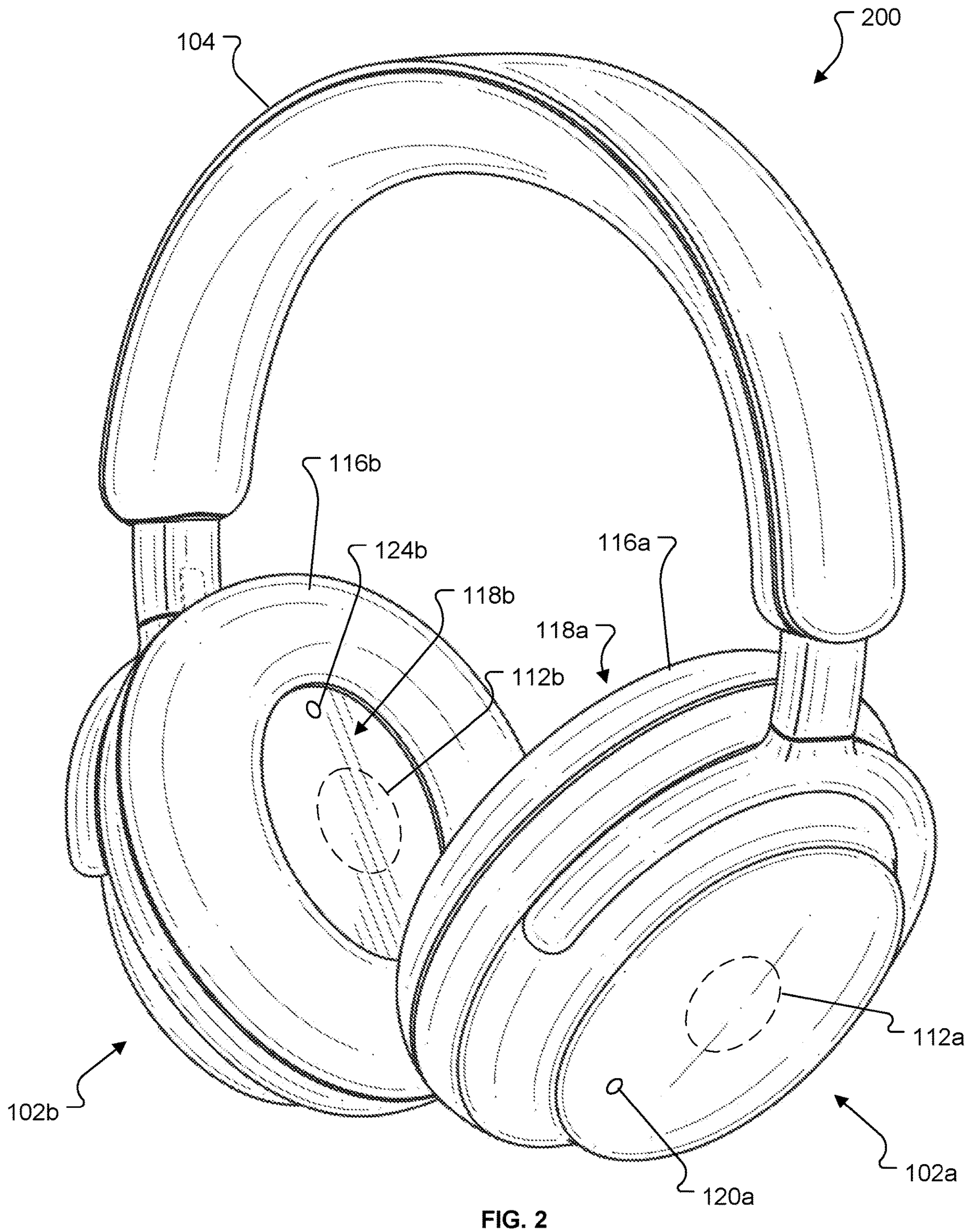
FIG. 2 depicts an over-the-head physical configuration of the personal ANR device of FIG. 1.

FIG. 2 depicts an around-the-ear physical configuration 200 of the personal ANR device 100 that incorporates a pair of earpieces 102 (i.e., first and second earpieces 102*a*, 102*b*) that are each in the form of an earcup, and that are connected by a headband 104. However, and although not specifically depicted, variants of the physical configuration 200 may replace the headband 104 with a different band structured to be worn around the back of the head and/or the back of the neck of a user.

As described above, the ear coupling 116 surrounds an opening to the cavity 110 and has a passage 118 that is formed through the ear coupling 116 and that communicates with the opening to the cavity 110.

Anything that prevents the earcup from making a tight seal with the ear or a user's head may result in a poor or leaky fit. With reference to FIG. 2, a leaky fit occurs when a tight seal does not exist between the ear coupling 116 of the earcup and the user's ear or head. For example, the arms of a user's glasses may interfere with the seal between the earcup and the user's ear. Hair between the ear coupling 116 or headband 104 and the user's head may also decrease the seal quality between the earcup and the user's ear. In another example, a hat or generally poorly fitting earcups or headband may interfere with the seal quality and degrade a user's listening experience.

Under certain conditions, a leaky fit may cause unwanted distortion between the ANR system and audio playback. The conditions may include high volume and high bass, in combination with a leaky fit between the earcup and the user's head. To address this issue, an audio limiter reduces the amplitude of the bass frequencies anytime the volume of the audio playback signal is high. Consequently, some current systems limit the audio regardless of the state of the ANR device relative the user's head or ear. If the audio from the playback path is loud and has a lot of bass, the audio limiter reduces the audio output simply because there is a potential for unwanted distortion. This conservative approach limits performance of the ANR device even when unnecessary and the device has more capability. Aspects of the present disclosure provide methods to intelligently use the audio limiter to limit the bass when and to the extent a leaky fit is detected. As compared to current methods, a state dependent audio limiter enables better performance by the ANR device when the fit is good while still decreasing distortion when the fit is poor.

As will be described in more detail below, the audio limiter advantageously and selectively limits the audio when and to the extent needed based on the detected state of the system. If there is a good seal or only a small leak, the intelligent functionality of the audio limiter provides enhanced performance by way of not limiting or appropriately limiting the bass output from the headphones. In contrast, current ANR devices simply reduce the bass of the audio signal. Therefore, the device described herein makes smarter decisions by dynamically adjusting the behavior of the audio limiter depending on the state of the device.

Figure 3:
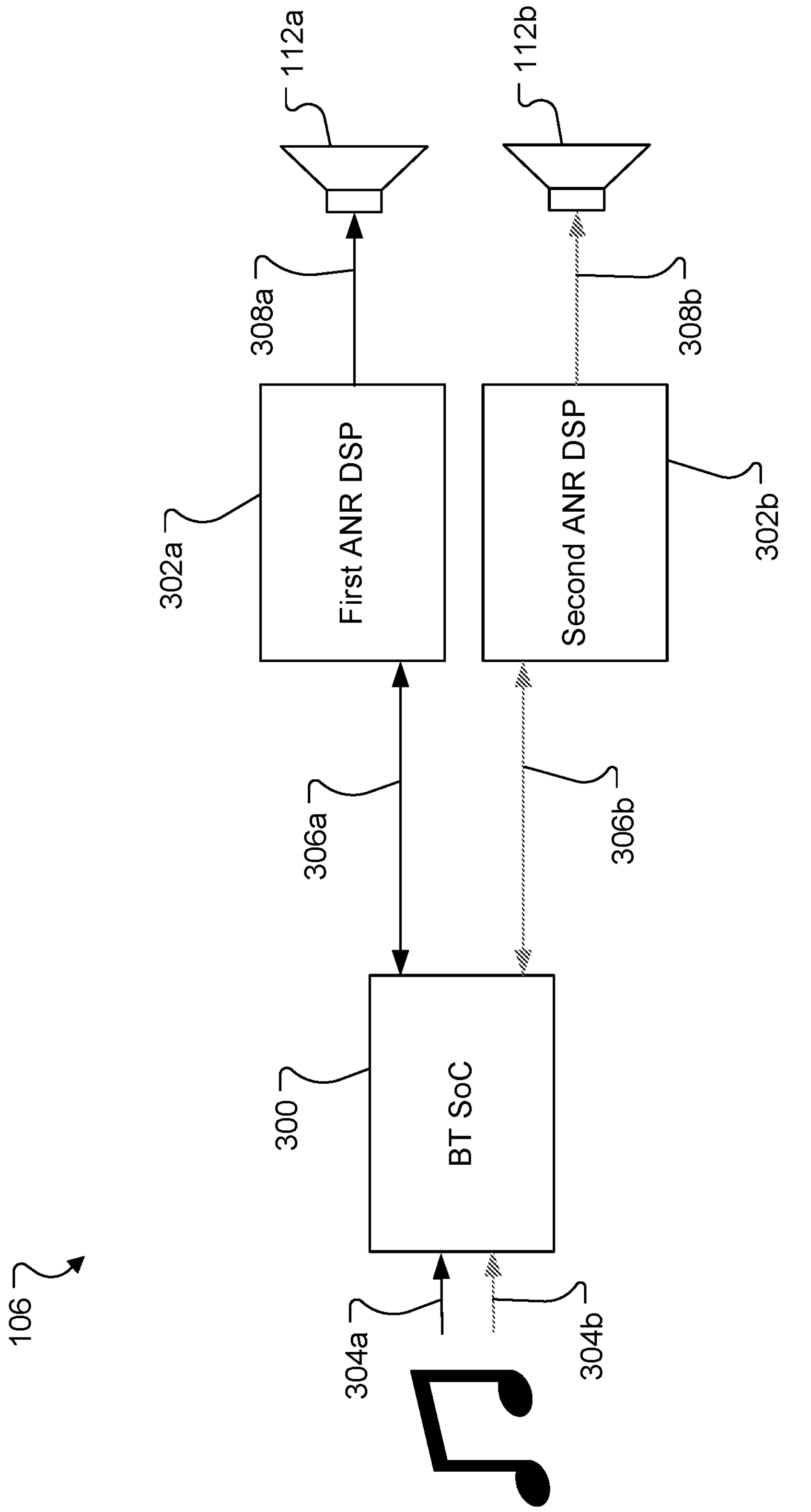
FIGS. 3 & 4 are block diagrams of an audio processing circuit in accordance with aspects of the present disclosure.

FIG. 3 illustrates an example high level block diagram of the audio processing circuit 106. In the illustrated example, the audio processing circuit 106 includes a plurality of integrated circuits (ICs) including a Bluetooth system-onchip (BT SoC 300) and a pair of ANR digital signal processors, i.e., first ANR DSP 302*a* and second ANR DSP 302*b* (generally referred to as "ANR DSP 302" or collectively "ANR DSPs 302"). The BT SoC 300 may be housed in one of the earpieces 102 and is configured to receive audio transmitted (wirelessly) from an audio source 126, and, in turn, transmits the received audio (a/k/a "input audio 304" or "input audio signal 304"), or a pre-processed version of it, to the first and second DSPs 302 for further processing. The BT SoC 300 may include a programmable DSP for performing processing operations on the input audio before it is sent over to the ANR DSPs 302. The processing (pre-processing) of the input audio on the BT SoC 300 can help save instruction space on the ANR DSPs 302, which can be limited and may be necessary or beneficial for other operations that are more sensitive to latency.

Each of the ANR DSPs 302 may be housed in a corresponding one of the earpieces 102. Time division multiplexed (TDM) links 306*a*, 306*b* (generally "TDM link 306" or collectively "TDM links 306") between the BT SoC 300 and the ANR DSPs 302 allows for the transfer of the audio data from the BT SoC 300 to the ANR DSPs 302. As will be discussed below, these links also enable the transfer of output from leak detectors running on the ANR DSPs 302 back to the BT SoC 300. In some cases, the input audio may include multichannel audio (e.g., stereo audio) and the BT SoC 300 may provide a first audio signal corresponding to a first audio channel (e.g., left channel audio) to the first ANR DSP 302*a* and a second audio signal corresponding to a second audio channel (e.g., right channel audio) to the second ANR DSP 302*b*. Each of the ANR DSPs 302 further processes the audio provided by the BT SoC 300 and provides an output audio signal 308*a*, 308*b* (generally "output audio signal 308" or collectively "output audio signals 308") to a corresponding one of the acoustic drivers 112.

With reference to FIG. 4, the DSP on the BT SoC 300 executes an audio processing module 400 that takes the input audio signal 304, e.g., including left channel input audio 304*a* and right channel input audio 304*b*, processes it and provides left and right processed input audio signals 402*a*, 402*b* (generally "processed input audio signal 402" or collectively "processed input audio signals 402") to the first and second ANR DSPs 302, respectively.

Each of the ANR DSPs 302 executes an ANR processing module 404*a*, 404*b* (generally "ANR processing module 404" or collectively "ANR processing modules 404") that further processes the corresponding processed input audio signal 304 using feedforward microphone signal 406 from a corresponding one of the feedforward microphones 120*a*, 120*b* and feedback microphone signal 406*a*, 406*b* from a corresponding one of the feedback microphones 124*a*, 124*b* to provide the output audio signals 308*a*, 308*b* to the left and right acoustic drivers 112*a* 112*b*, respectively.

Figure 5A:
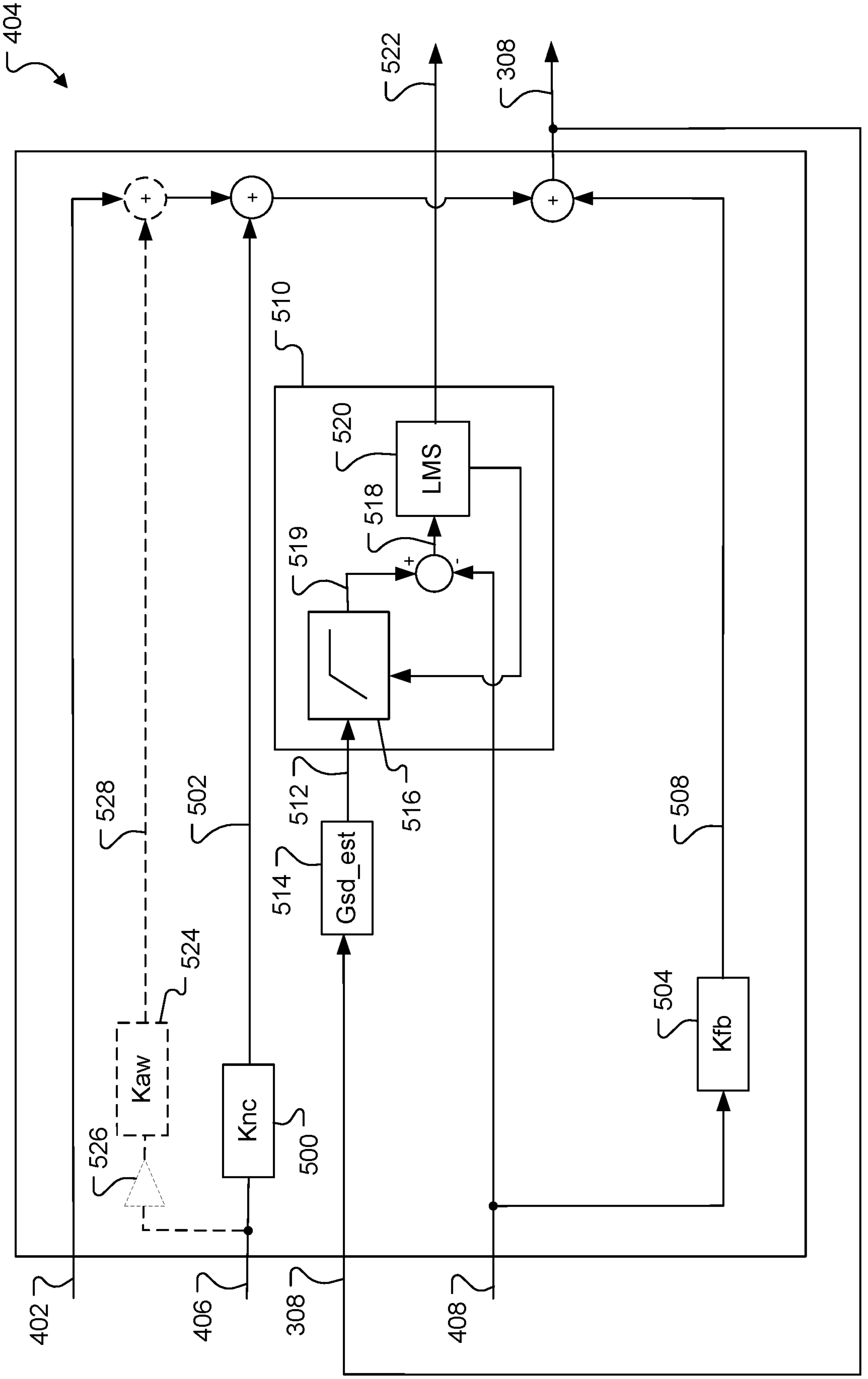
FIG. 5A is a block diagram of one implementation of an active noise reduction (ANR) processing module in accordance with aspects of the present disclosure.

FIG. 5A is a block diagram of an example ANR processing module 404. The ANR processing module 404 includes a feedforward compensator 500 (also denoted as $K_{nc}$) that receives the feedforward microphone signal 406 and generates a feedforward anti-noise signal 502 to reduce the effects of a noise signal picked up by the feedforward microphone 120. The feedback microphone signal 408 is filtered by a feedback compensator 504 (also denoted $K_{fb}$) to provide a feedback anti-noise signal 508. The processed input audio signal 402 is combined with the feedforward anti-noise signal 502 and the feedback anti-noise signal 508 to provide the output audio signal 308.

Notably, the ANR processing module 404 also includes a leak detector 510 implemented as an adaptive filter. There are two inputs to the leak detector 510—the feedback microphone signal 408 and a predicted feedback microphone signal 512, which represents what the feedback microphone signal would be expected to look like if there were no leak. To create the predicted feedback microphone signal 512, the output audio signal 308 (a/k/a "driver signal") is filtered through an estimate (e.g., an offline estimate, an online estimate, or an updating estimate) of the transfer function ($G_{sd}$) 514 that represents the acoustic path between the acoustic driver 112 and the feedback microphone 124 (which may also be referred to as the system microphone or sensor s) with a good fit. The predicted feedback microphone signal 512 is filtered via a high-pass filter 516. The high-pass filter 516 may be a first order high-pass filter, or, alternatively, a more complicated filter that better fits the transition between a good fit and a leaky fit could also be applied. An error signal 518, corresponding to a difference between the high-pass filtered signal 519 and the feedback microphone signal 408, serves as the input to an adaptive algorithm 520 that is used to adapt (update) the coefficients of the high-pass pass filter 516. The adaptive algorithm 520 may be a least mean squares (LMS) algorithm (e.g., sign-sign LMS, NLMS, PCA-LMS). The output 522 of the leak detector 510 is a value that corresponds to the center frequency of the high-pass filter 516. The higher the value, the more likely that a leak is present. That center frequency value is the input to a threshold-based gain modulation. Both ANR processing modules 404*a*, 404*b* may be similarly configured with each providing it is own, respective leak detector output 522*a*, 522*b* (FIG. 4). While an implementation has been described in which an adaptive algorithm is used to update the coefficients of the high-pass filter 516, in other implementations, other methods of controlling/varying the shape of the high-pass filter 516 may be used.

In aspects, the feedforward microphone signal 406 may undergo additional ANR processing. For example, the ANR processing module 404 may also provide hear-through (a/k/a "transparency") processing, which can adjust or control (or allow a user to control) an amount of ambient noise passed through the device while maintaining ANR functionalities. To enable control of the amount of ambient noise passed through the device, an adjustable gain may be implemented, such as by selecting a set of coefficients for a hear-through filter 524. Alternatively or additionally, an adjustable gain may be implemented using a variable gain amplifier 526 arranged in series with the hear-through filter 524. In some cases, an adjustable gain may be implemented using a combination of adjustments to a variable gain amplifier 526 and the hear-through filter 524, each disposed in the hear-through signal flow path.

In the example illustrated in FIG. 5A, the feedforward microphone signal 406 is passed through the combination of the pass-through (hear-through) filter 524 and the variable gain amplifier (VGA) 526. The output 528 of the hear-through filter 524 is combined with the processed input audio signal 402, feedforward anti-noise signal 502, and the feedback anti-noise signal 508 to provide the output audio signal 308.

Figure 5B:
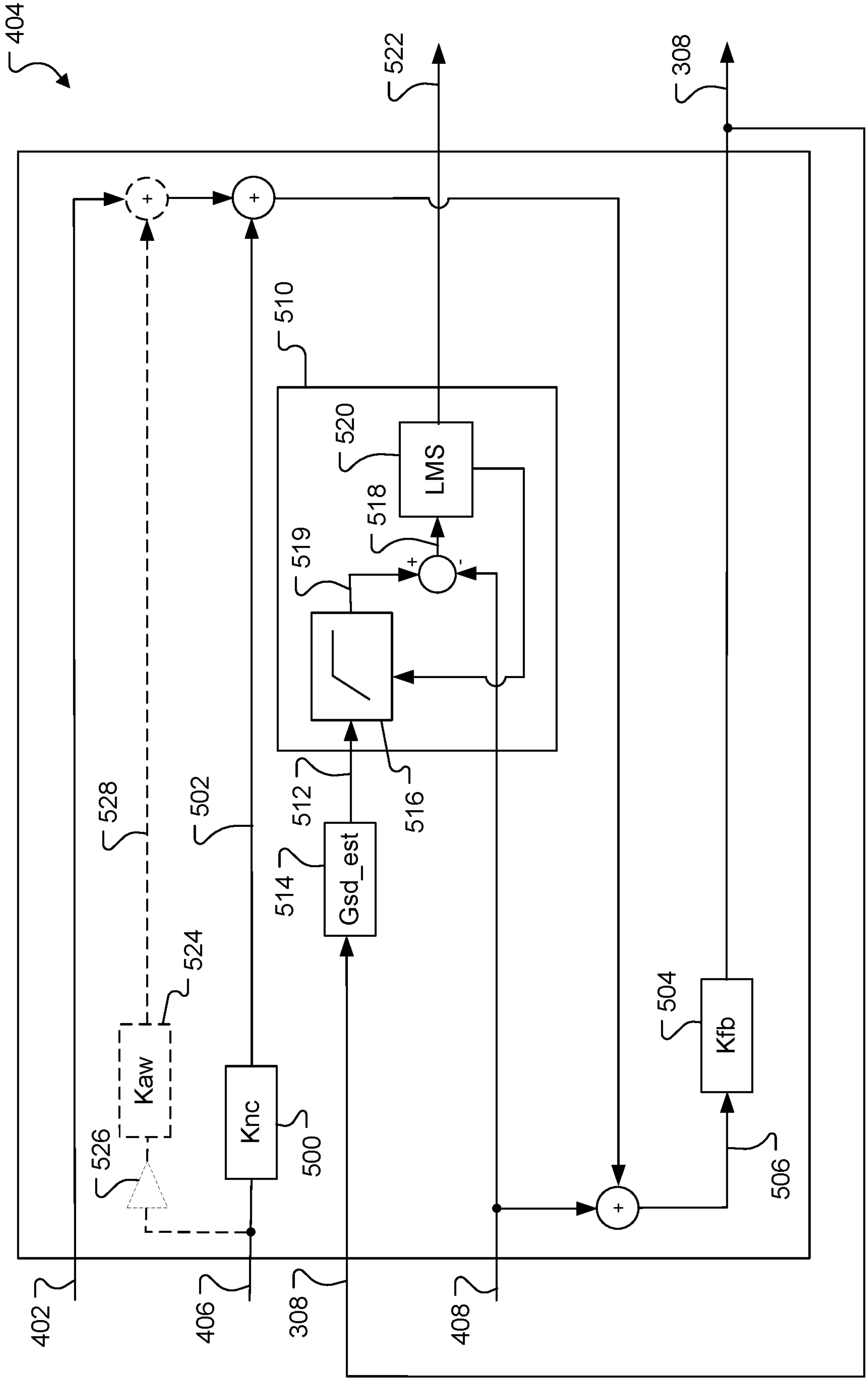
FIG. 5B is a block diagram of another implementation of an active noise reduction (ANR) processing module in accordance with aspects of the present disclosure.

FIG. 5A illustrates an implementation in which the processed input audio 402, the feedforward anti-noise signal 502, the feedback anti-noise signal 508, and the hear-through output signal 528 are combined to provide the output audio signal 308 in a "disturbance injection" configuration. FIG. 5B illustrates another implementation of the ANR processing module 404 in which the processed input audio 402 is combined with the hear-through output signal 528, the feedforward anti-noise signal 502 and the feedback microphone signal 408 to form a combined signal 506 that is then filtered via the feedback compensator 504 to provide the output audio signal 308 in a "command injection" configuration. Still, other implementations are possible.

FIG. 6 is a block diagram of an example audio processing module 400. The input audio signals 304*a*, 304*b* are amplified by a preamplifer (preamp 600) and the amplified signals 602*a*, 602*b* are fed to an equalization filter 604, which provides for general audio shaping. The equalized audio signals 606*a*, 606*b* are then passed through a volume control 608 (which may be adjusted via user input (not shown)) and the volume adjusted signals 610*a*, 610*b* then pass through a limiter 612 before being output as the processed input audio signals 402*a*, 402*b*. The limiter 612 may or may not limit the processed input audio signals 402*a*, 402*b*, e.g., depending on input received from a gain block 614.

The audio processing module 400 also includes a max signal detector 618. The max signal detector 618 receives the leak detector output signals 522*a*, 522*b* as input and first determines which of those two signals is greater, and, thus, more likely to be indicative of a leaky fit. A lookup table 620 is then used to convert/translate the value (e.g., between 0.6 and 1) of the max leak detector signal 522 into a value (e.g., between 0 and 10 or between −1 and 1) that the gain block 614 can use to adjust a gain applied to the volume adjusted signals 610*a*, 610*b*. The lookup table 620 provides that value as input (signal 622) to the gain block 614. The limiter 612, in turn, uses the volume adjusted signals 610*a*, 610*b* to determine whether or not to limit the volume adjusted signals 610*a*, 610*b* (i.e., to provide the processed input audio signals 402*a*, 402*b*), and, if so, by how much. If the fit quality is good (i.e., no or low leak), then the gain block 614 will apply low or no gain and the limiter will only slightly limit the audio or will pass it through without limiting. On the other hand, if there is a leak, the gain applied by the gain block 614 will increase, and, in response, the limiter 612 will respond by turning the audio down.

Notably, the leak detector 510 is configured such that the audio processing path(s) (e.g., of audio processing module 400) is/are informed of a leak before loud audio is played or at least very quickly so that the duration of any distortion is minimized.

Figure 7:
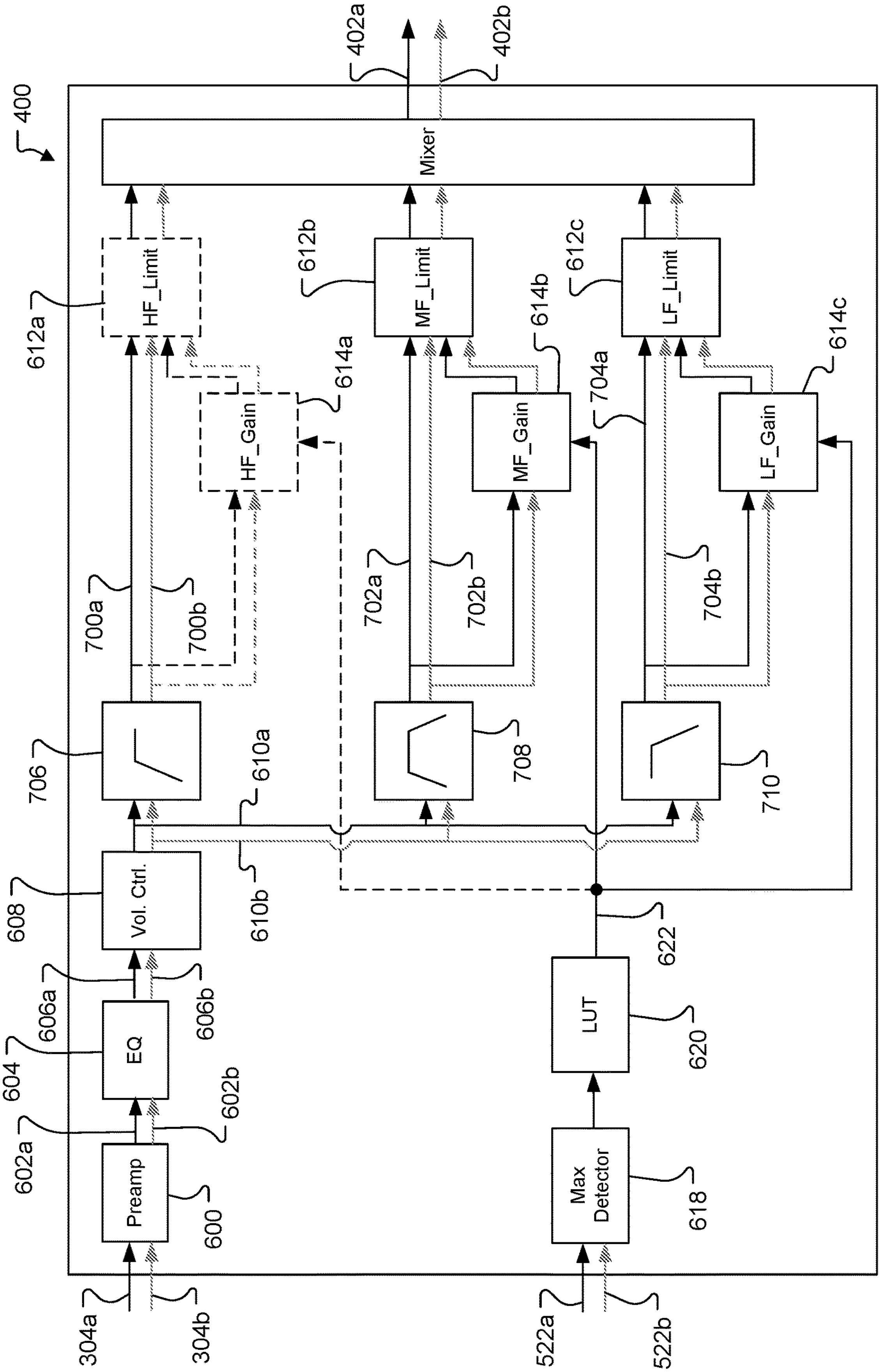
FIG. 7 is a block diagram of another implementation of an audio processing module in accordance with aspects of the present disclosure.

FIG. 7 illustrates another example audio processing module 400 which provides split-band limiting. In this implementation, the volume adjusted signals 610 are split into high-frequency 700*a,b*, mid-frequency 702*a,b*, and low-frequency signals 704*a,b* via a high-pass filter 706, a band-pass filter 708, and a low-pass filter 710, respectively. The high-frequency 700*a,b*, mid-frequency 702*a,b*, and low-frequency signals 704*a,b* are then fed to respective gain blocks 614*a-c* and limiters 612*a-c*. In the implementation illustrated in FIG. 7, the output signal 620 from the lookup table 620 is provided to the mid-frequency gain block 614*b* and the low-frequency gain block 614*c*, as those are frequency ranges in which a leak can be expected to have the most detrimental effect (e.g., audible distortion and clipping). However, in some implementations, the output signal 620 may also be provided to the high-frequency gain block 614*a*. The gain block 614*a-c* and limiters 612*a-c* operate in same manner as described above with respect to FIG. 6. The respective outputs of the limiters 612*a-c* are combined via a mixer 712 to provide the processed input audio signals 402*a*, 402*b*.

While implementations have been described in which the ANR processing and input audio processing are distributed on different ICs, in some implementations, the ANR processing and the input audio processing may be performed on a common IC.

It can be noted that, descriptions of aspects of the present disclosure are presented above for purposes of illustration, but aspects of the present disclosure are not intended to be limited to any of the disclosed aspects. Many modifications and variations will be apparent to those of ordinary skill in the art without departing from the scope and spirit of the described aspects.

In the preceding, reference is made to aspects presented in this disclosure. However, the scope of the present disclosure is not limited to specific described aspects. Aspects of the present disclosure can take the form of an entirely hardware aspect, an entirely software aspect (including firmware, resident software, micro-code, etc.) or an aspect combining software and hardware aspects that can all generally be referred to herein as a "component," "circuit," "module" or "system." Furthermore, aspects of the present disclosure can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, a non-transitory computer readable medium or any suitable combination of the foregoing. In the current context, a computer readable storage medium can be any tangible medium that can contain or store a program.

The block diagrams in the Figures illustrate the architecture, functionality and operation of possible implementations of systems, methods and computer program products according to various aspects. In this regard, each block in the flowchart or block diagrams can represent a module, segment or portion of code, which comprises one or more executable instructions for implementing the specified logical function(s). Each block of the block diagrams and combinations of blocks in the block diagrams and can be implemented by special-purpose hardware-based systems that perform the specified functions or acts, or combinations of special purpose hardware and computer instructions.

A number of implementations have been described. Nevertheless, it will be understood that additional modifications may be made without departing from the scope of the inventive concepts described herein, and, accordingly, other embodiments are within the scope of the following claims.

What is claimed is:

1. A method performed by active noise reduction (ANR) headphones comprising:

comparing a feedback microphone signal to a predicted feedback microphone signal representing what the feedback microphone signal would be expected to look like if there were no leak between the headphones and a user wearing the headphones; and adaptively adjusting an audio limiter based, at least in part, on the comparison, wherein comparing the feedback microphone signal to the predicted feedback microphone signal comprises providing the feedback microphone signal and the predicted feedback microphone signal as inputs to a leak detector, wherein the leak detector comprises a high-pass filter and wherein comparing the feedback microphone signal to the predicted feedback microphone signal comprises filtering the predicted feedback microphone signal with the high-pass filter to provide a high-pass filtered signal, and wherein comparing the feedback microphone signal to the predicted feedback microphone signal comprises determining an error signal corresponding to a difference between the feedback microphone signal and the high-pass filtered signal, and the method further comprises:

providing the error signal to an adaptive algorithm, and using output of the adaptive algorithm to update a transfer function of the high-filter.

2. The method of claim 1, wherein comparing the feedback microphone signal to the predicted feedback microphone signal comprises determining an error signal corresponding to a difference between the feedback microphone signal and the high-pass filtered signal, and the method further comprises:

providing the error signal to an adaptive algorithm, and using output of the adaptive algorithm to update a transfer function of the high-pass filter.

3. A method performed by active noise reduction (ANR) headphones comprising:

comparing a feedback microphone signal to a predicted feedback microphone signal representing what the feedback microphone signal would be expected to look like if there were no leak between the headphones and a user wearing the headphones; and adaptively adjusting an audio limiter based, at least in part, on the comparison, wherein comparing the feedback microphone signal to the predicted feedback microphone signal comprises providing the feedback microphone signal and the predicted feedback microphone signal as inputs to a leak detector, wherein the leak detector comprises a high-pass filter and wherein comparing the feedback microphone signal to the predicted feedback microphone signal comprises filtering the predicted feedback microphone signal with the high-pass filter to provide a high-pass filtered signal, and wherein the audio limiter is adjusted based on a center frequency value of the high-pass filter.

4. An active noise reduction (ANR) audio output device, comprising:

a memory comprising computer-executable instructions; and a processor configured to execute the executable instructions and cause the audio output device to:

compare a feedback microphone signal to a predicted feedback microphone signal representing what the feedback microphone signal would be expected to look like if there were no leak between the ANR audio output device and a user wearing the ANR audio output device; and adaptively adjust an audio limiter based, at least in part, on the comparison, wherein the computer-executable instructions for comparing the feedback microphone signal to the predicted feedback microphone signal comprise instructions for providing the feedback microphone signal and the predicted feedback microphone signal as inputs to a leak detector, wherein the leak detector comprises a high-pass filter and wherein comparing the feedback microphone signal to the predicted feedback microphone signal comprises filtering the predicted feedback microphone signal with the high-pass filter to provide a high-pass filtered signal, and wherein the computer-executable instructions for comparing the feedback microphone signal to the predicted feedback microphone signal comprise instructions for:

determining an error signal corresponding to a difference between the feedback microphone signal and the high-pass filtered signal and providing the error signal to an adaptive algorithm, and using output of the adaptive algorithm to update a transfer function of the high-pass filter.

5. The ANR audio output device of claim 4, wherein the computer-executable instructions for comparing the feedback microphone signal to the predicted feedback microphone signal comprise instructions for:

determining an error signal corresponding to a difference between the feedback microphone signal and the high-pass filtered signal and providing the error signal to an adaptive algorithm, and using output of the adaptive algorithm to update a transfer function of the high-pass filter.

6. The ANR audio output device of claim 4, wherein the computer-executable instructions for adaptively adjusting the audio limiter comprises instructions for adjusting the audio limiter based on a center frequency value of the high-pass filter.

7. A method performed by active noise reduction (ANR) headphones comprising:

adaptively adjusting a gain applied to an audio signal to provide a gain adjusted audio signal;

providing the audio signal and the gain adjusted audio signal to an audio limiter; and limiting the audio signal based on the gain adjusted audio signal to provide an adjusted audio signal, wherein adaptively adjusting the gain applied to the audio signal comprises adjusting the gain based on an output received from a leak detector, and wherein the leak detector comprises a high-pass filter and an adaptive algorithm configured to update a transfer function of the high-pass filter, and wherein the output of the leak detector corresponds to a center frequency value of the high-pass filter.

8. The method of claim 7, wherein the leak detector comprises a high-pass filter and an adaptive algorithm configured to update a transfer function of the high-pass filter, and wherein the output of the leak detector corresponds to a center frequency value of the high-pass filter.

9. The method of claim 7, further comprising translating the center frequency value to a gain value.

10. The method of claim 7, further comprising translating the center frequency value to a gain value via a lookup table.

11. The method of claim 7, further comprising:

receiving a feedback microphone signal from a feedback microphone;

filtering a driver signal with an estimate of a transfer function representing an acoustic path between an acoustic driver and the feedback microphone with a good fit to provide a predicted feedback microphone signal, representing what the feedback microphone signal would be expected to look like if there were no leak between the headphones and a user wearing the headphones;

filtering the predicted feedback microphone signal with the high-pass filter to provide a high-pass filtered signal;

providing an error signal, representing a difference between the feedback microphone signal and the high-pass filtered signal, to the adaptive algorithm; and using output of the adaptive algorithm to update a transfer function of the high-pass filter.

* * * * *